US008984761B1

(12) United States Patent
Brooks et al.

(10) Patent No.: US 8,984,761 B1
(45) Date of Patent: Mar. 24, 2015

(54) BATTERY SELECTION DEVICE

(71) Applicants: Christopher Brooks, Barrington, RI (US); Adrian Fournier, Cranston, RI (US); Jeremy Mallo, North Attleboro, MA (US); Carl Toti, Pascoag, RI (US)

(72) Inventors: Christopher Brooks, Barrington, RI (US); Adrian Fournier, Cranston, RI (US); Jeremy Mallo, North Attleboro, MA (US); Carl Toti, Pascoag, RI (US)

(73) Assignee: Plastics Plus, Inc, Cumberland, RI (US)

(*) Notice: Subject to any disclaimer, the term of this patent is extended or adjusted under 35 U.S.C. 154(b) by 0 days.

(21) Appl. No.: 13/999,531

(22) Filed: Mar. 8, 2014

(51) Int. Cl.
*G07C 3/02* (2006.01)
*B07C 5/12* (2006.01)
*G01B 3/34* (2006.01)

(52) U.S. Cl.
CPC .......................................... *G01B 3/34* (2013.01)
USPC ................................ 33/555.3; 453/63; 453/9

(58) Field of Classification Search
CPC ............ B07B 13/04; B07C 5/04; B07C 5/06; B07C 5/12; B65F 1/00; B65F 1/14; G01B 5/02; G01B 5/04; G01B 5/06; G01B 5/08; G01B 5/10; G01B 21/02; G01B 21/06; G01B 21/10; G01B 21/12; G01B 3/00; G01B 3/14; G01B 3/34; G01B 21/08; G07D 3/02; G07D 3/04; G07D 3/10; H01M 10/54
USPC ................ 33/555.3; 206/703, 704, 722, 723; 232/44; 453/3, 9, 14, 15, 63
See application file for complete search history.

(56) References Cited

U.S. PATENT DOCUMENTS

| | | | | |
|---|---|---|---|---|
| 262,886 | A | 8/1882 | Barker | |
| 502,715 | A | 8/1893 | Gunther | |
| 574,528 | A | 1/1897 | Elder | |
| 1,433,942 | A | 10/1922 | Doldt | |
| 4,379,466 | A | 4/1983 | Furuya | |
| 4,427,389 | A | 1/1984 | D'Andrade | |
| 4,573,485 | A | 3/1986 | Nye | |
| 4,593,709 | A * | 6/1986 | Duplessy | 453/9 |
| 4,995,848 | A | 2/1991 | Goh | |
| 5,106,337 | A | 4/1992 | Knox | |
| 5,474,496 | A | 12/1995 | Perkitny | |
| 6,017,270 | A | 1/2000 | Ristvedt | |

FOREIGN PATENT DOCUMENTS

| | | | | | |
|---|---|---|---|---|---|
| CA | 2404612 | A1 * | 3/2004 | G07D 3/10 |
| CN | 202124252 | U * | 1/2012 | B65F 1/14 |
| FR | 2543672 | A * | 10/1987 | G01B 3/14 |
| FR | 2705774 | A1 * | 12/1994 | G01B 3/14 |
| FR | 2826764 | A1 * | 1/2003 | G07D 3/02 |

* cited by examiner

*Primary Examiner* — R. A. Smith
(74) *Attorney, Agent, or Firm* — Robert J Doherty

(57) ABSTRACT

A battery identification device which sorts a specialty battery requiring replacement initially by diameter then subsequently by thickness through the interaction of an open channel and ridges which include progressively larger ridges that project into the channel to form zones of progressively diminished thickness.

13 Claims, 16 Drawing Sheets

BATTERY SELECTION DEVICE

U.S. UTILITY PATENT APPLICATION

Claims benefit of Provisional Patent Application 61/852,011 filed Mar. 13, 2013

BACKGROUND OF THE INVENTION

This invention is directed to the identification and replacement of specialty batteries that are generally referred to as button or coin cell batteries. Such specialty batteries are commonly utilized in watches as well as numerous other small devices including but not limited to timers and thermometers. When such batteries fail, it is desirable to have a means to identify the model or battery number to enable the purchase of a replacement battery at a retail store and self-install the battery as opposed to having a replacement battery installed by a to specialist or clerk at a watch store or other retail business establishment. Such do-it-yourself approach is not always possible as the identifying engraving or other stamping on the battery is difficult to read, varies between manufacturers and also because retail store packaging often hinders comparison.

Accordingly, it would be desirable to be able to place the failed battery in a device that automatically identifies such battery by manufacturer and/or battery number to facilitate the purchase of a replacement battery. Thus, a primary object of the present invention is to provide an inexpensive, relatively simple device that sorts the failed battery and automatically displays the appropriate replacement battery number without need for further consumer input.

A further object of the present invention is to provide a device for sorting and identifying a dead or defective specialty battery for replacement purposes that utilizes the unique diameter and thickness characteristics of such battery.

These and other objects of the present invention are accomplished by a device for identifying a particular type of a coin-like object such as a specialty battery by progressively measuring first the diameter of such object and second the thickness of such object, such device comprising a frame in turn comprised of a front panel and a rear panel, said rear panel including a generally planar wall having a front surface in turn having upstanding transversely spaced vertically disposed sidewalls which define at least one vertically oriented channel having an open slot at the top thereof and a closed bottom at varying vertical positions, said front panel including a generally planar wall having a front surface and a rear surface in turn provided with at least one pair of laterally spaced rearwardly extending vertically oriented ridges in turn adapted to extend into said rear panel channel when said panels are oriented in nested operational relationship with each other, said ridges including a plurality of vertically spaced ledges which extend into said channel to which the ridges are associated with and having a greater extent at the bottom of the channel than at the top thereof so as to create zones of progressively diminished thickness as the object travels to down the channel from the top to the bottom thereof until such object is held from further travel by the channel bottom formed by the interaction between the channel front surface and the rear surface of said ridges associated with said channel.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
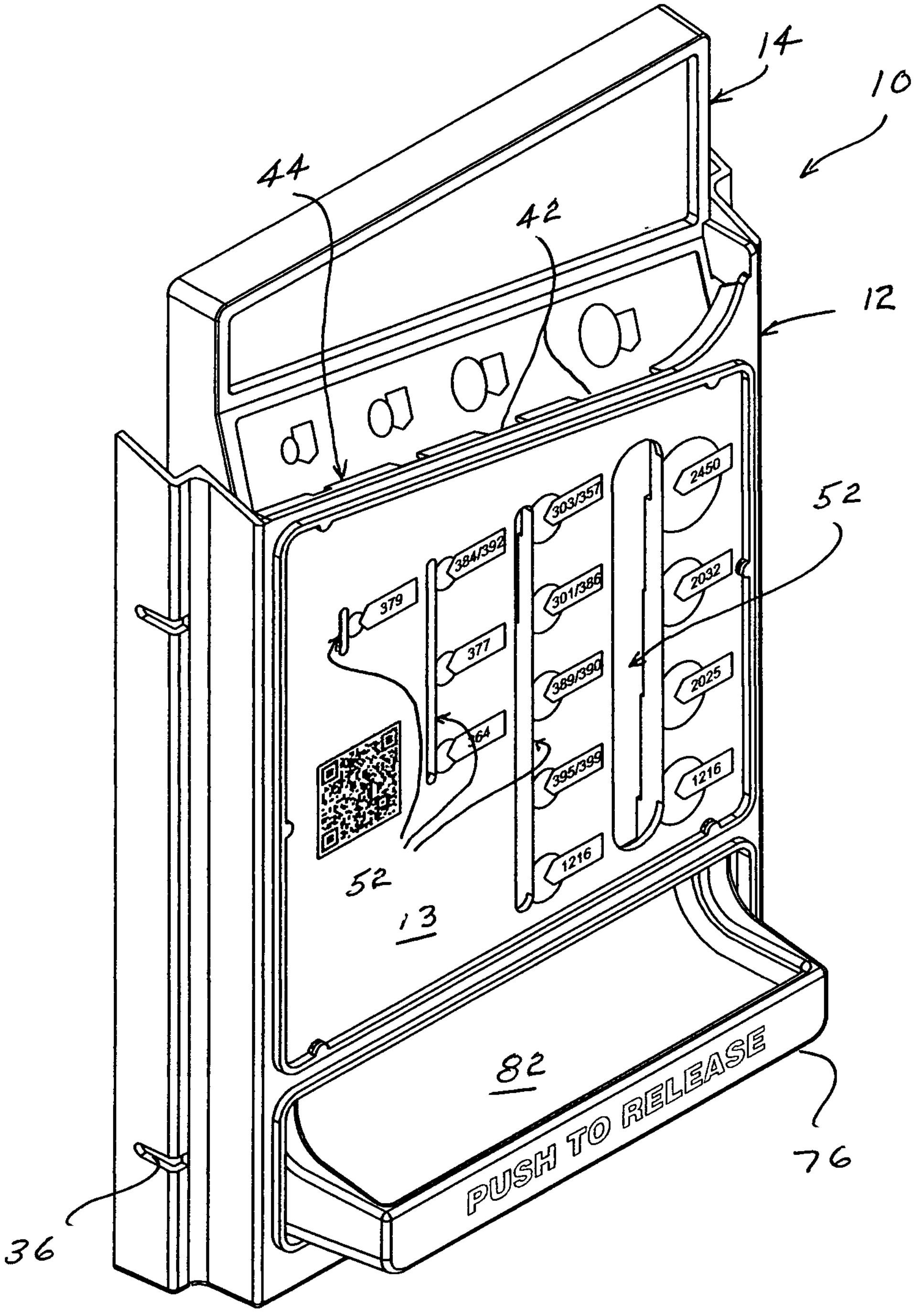
FIG. 1 is a front perspective view of an assembled device incorporating the present invention.
Figure 2:
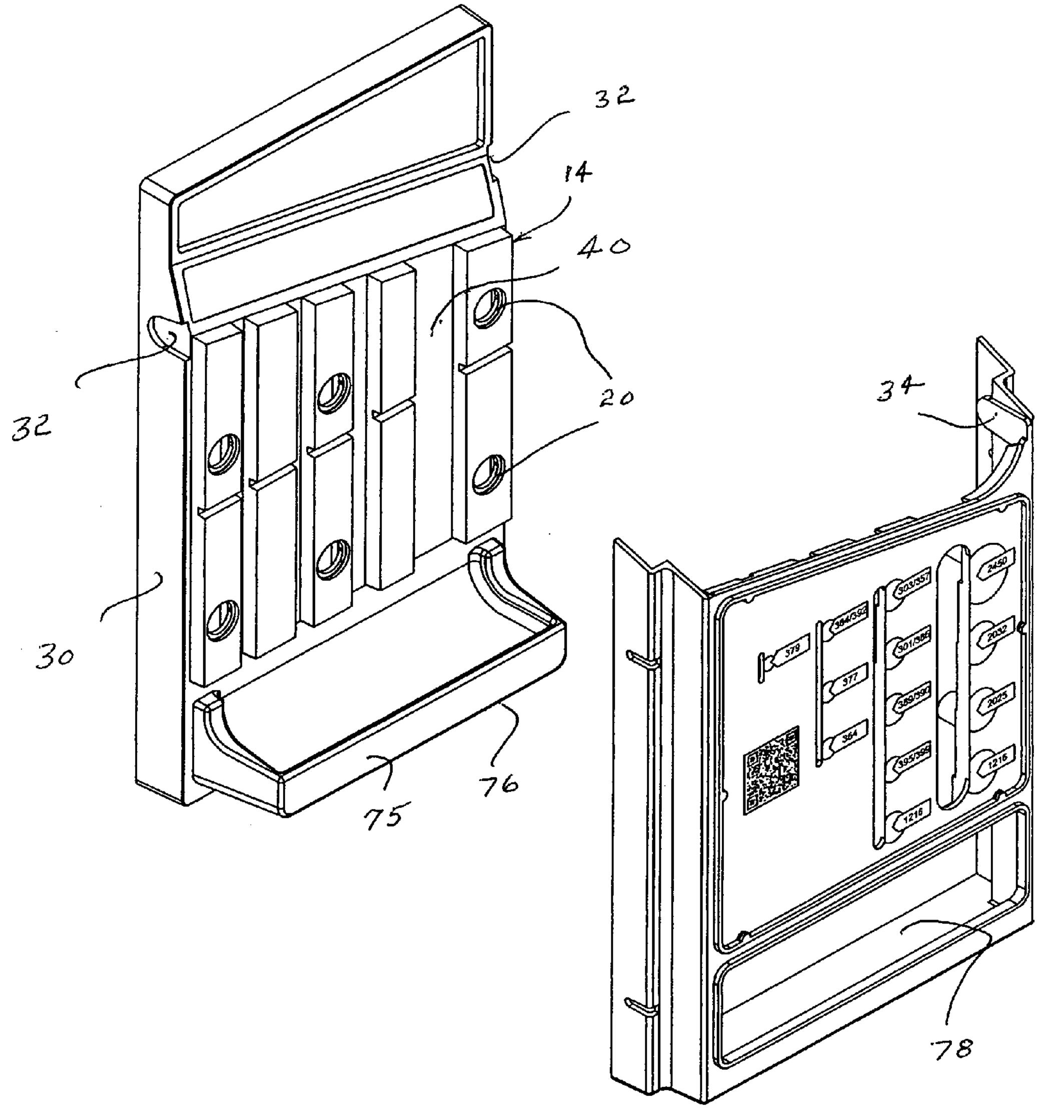
FIG. 2 is a perspective view similar to FIG. 1 but wherein the device is separated into two major components.
Figure 3:
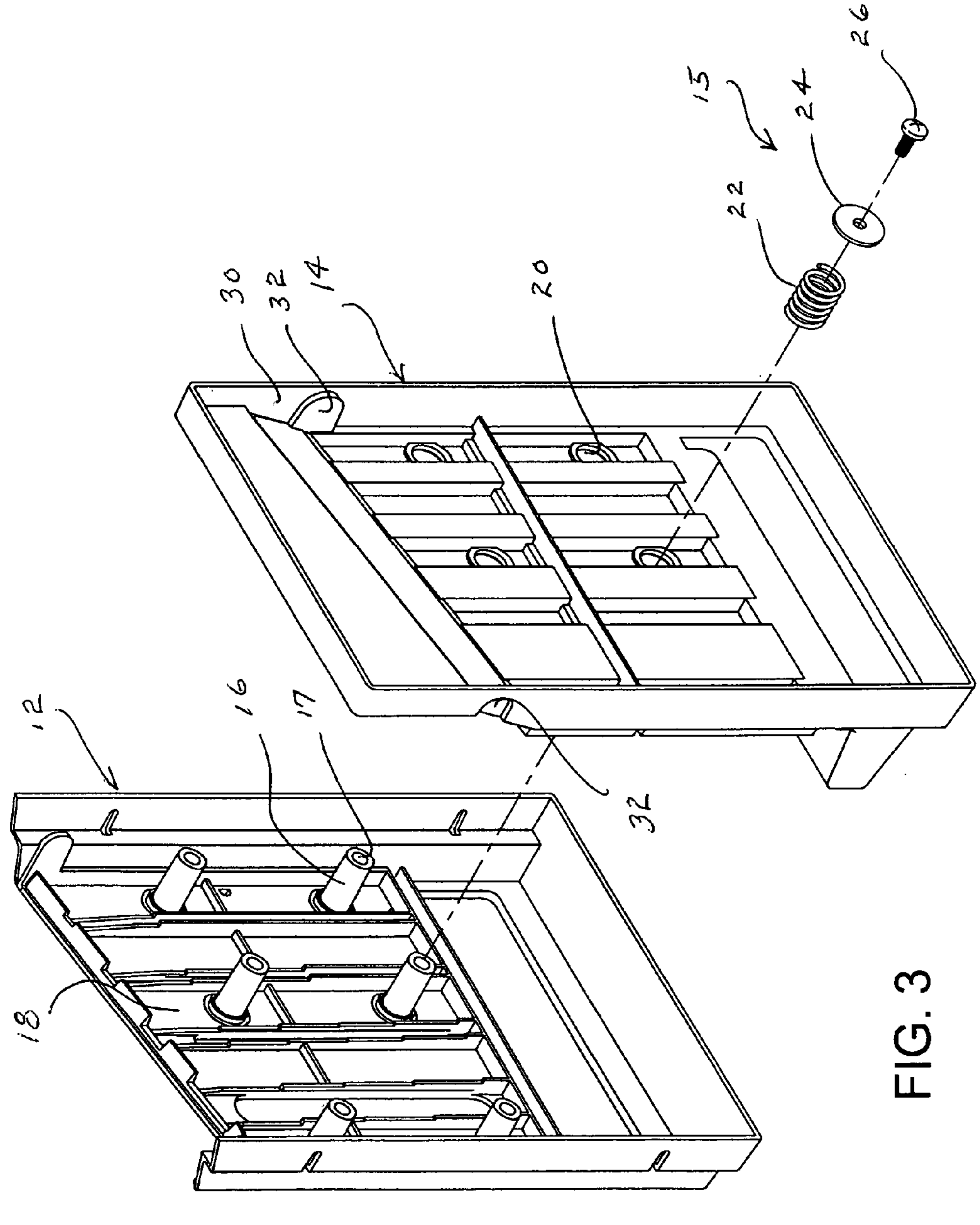
FIG. 3 is a rear perspective view similar to FIG. 2 of the two major components of the device.
Figure 4:
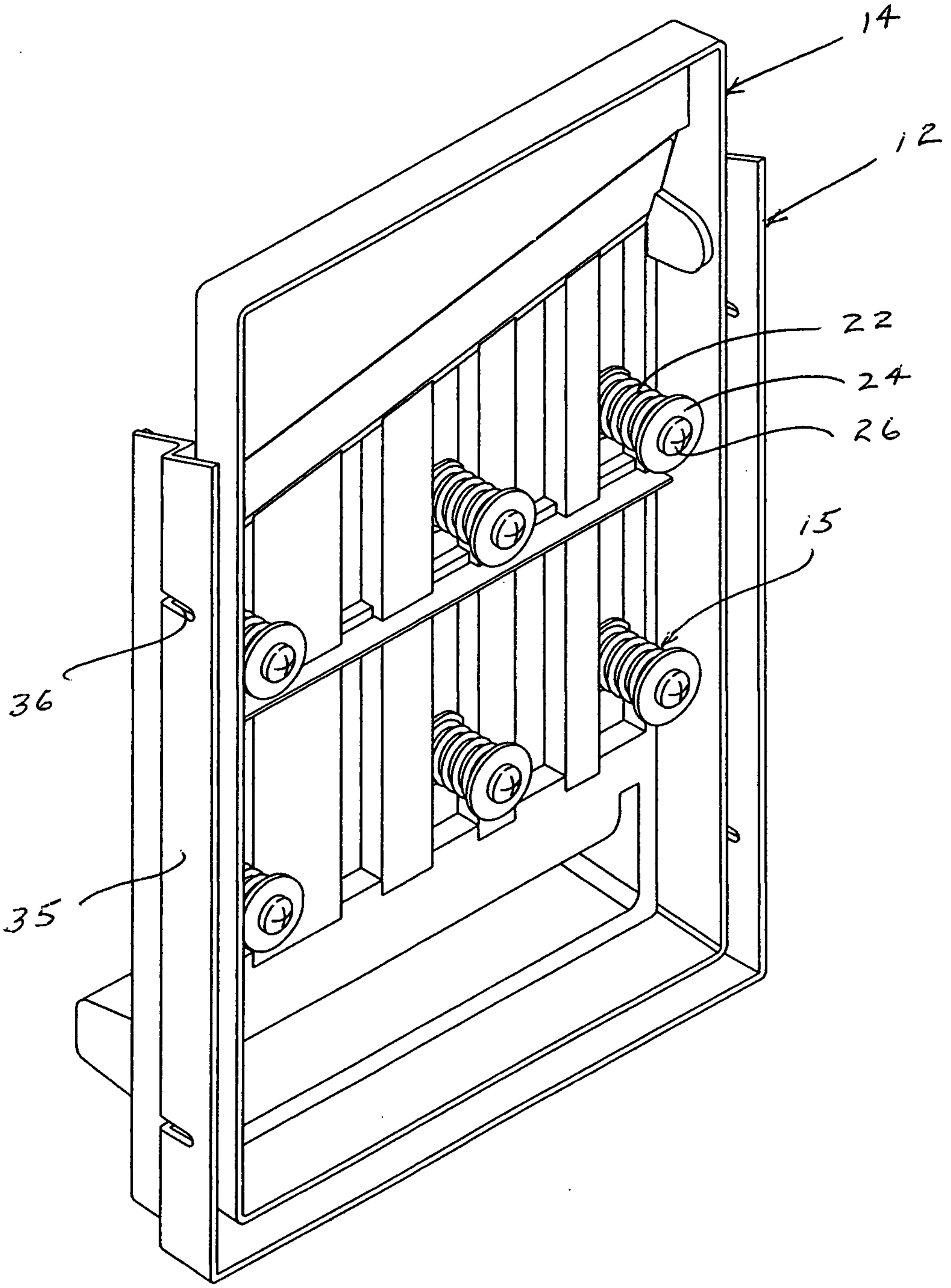
FIG. 4 is an enlarged rear perspective view of the rear panel of the device.
Figure 5:
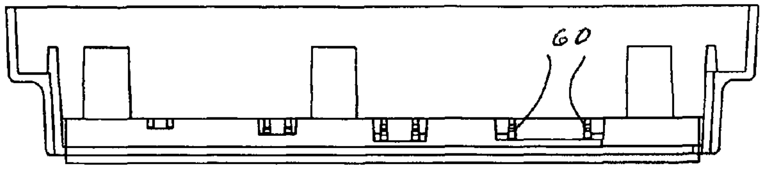
FIG. 5 is a top view of the front panel of the device.
Figure 6:
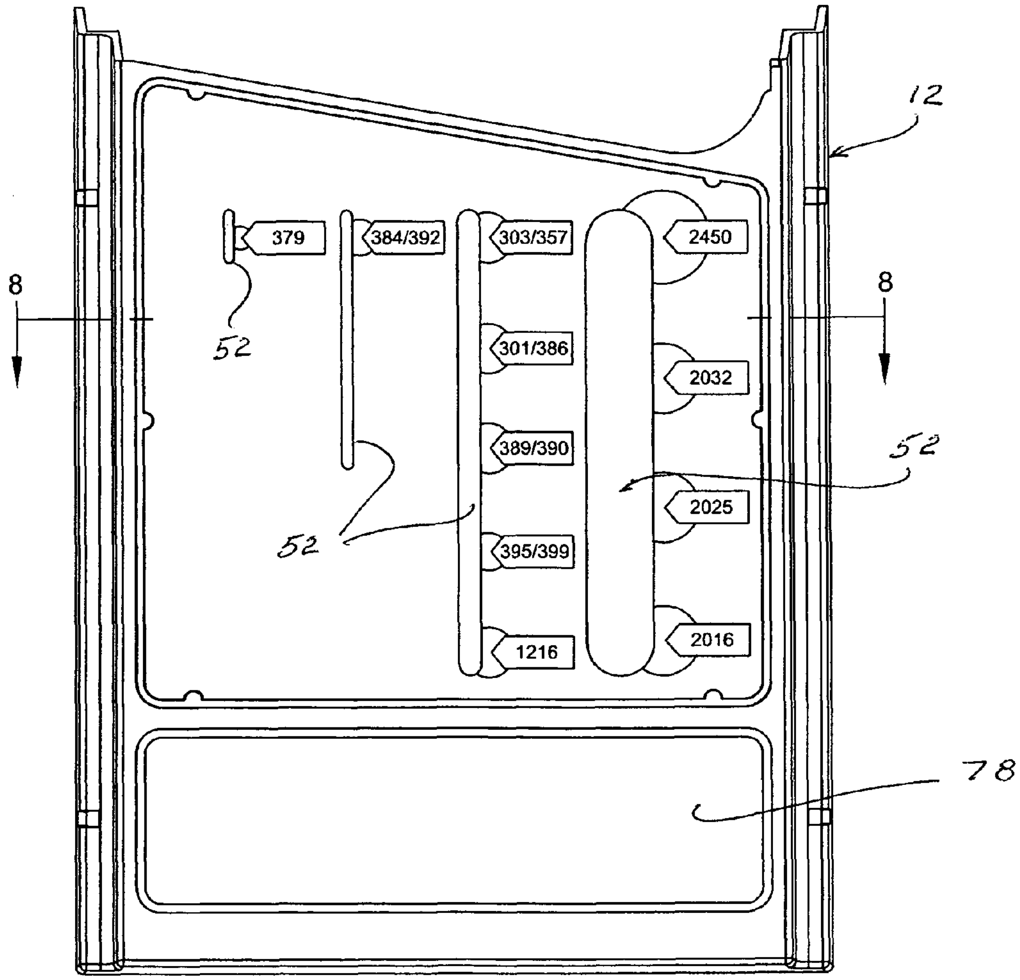
FIG. 6 is a front elevational view of the front panel.
Figure 7:
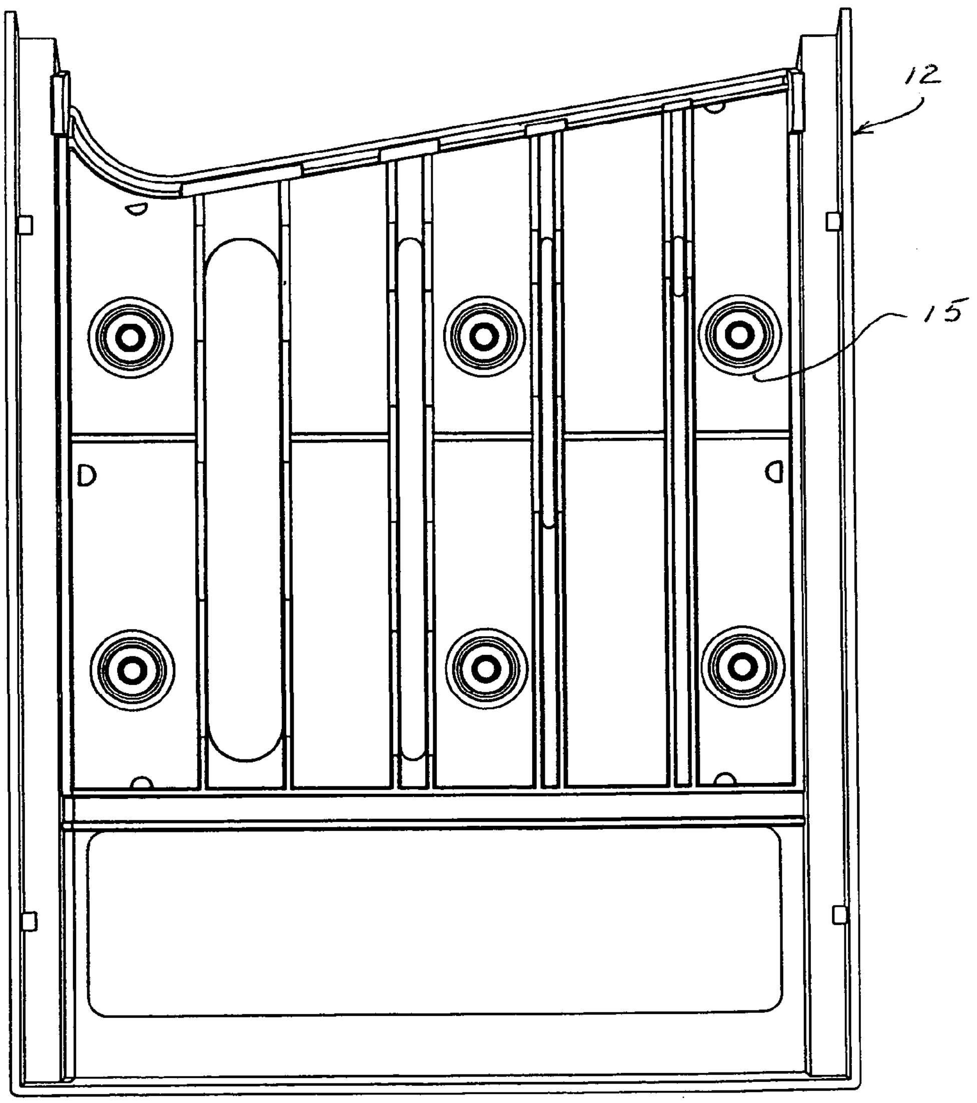
FIG. 7 is a rear elevational view of the rear panel shown in FIG. 4.
Figure 8:
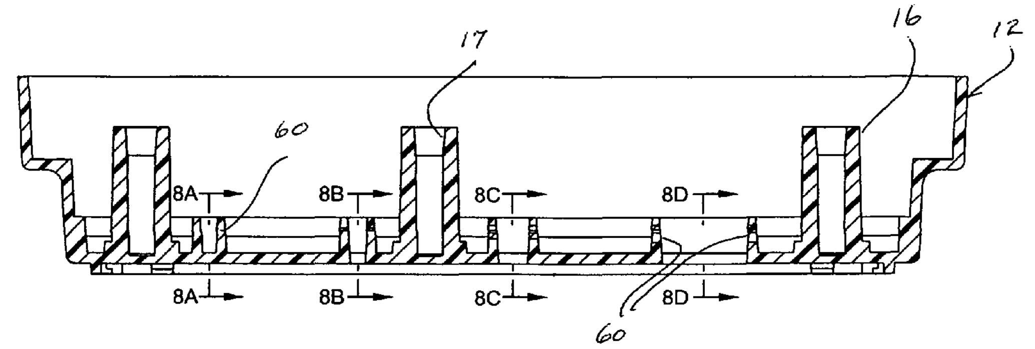
FIG. 8 is a sectional view along the line 8-8 of FIG. 6.
Figures 8A, 8B, 8C, 8D:
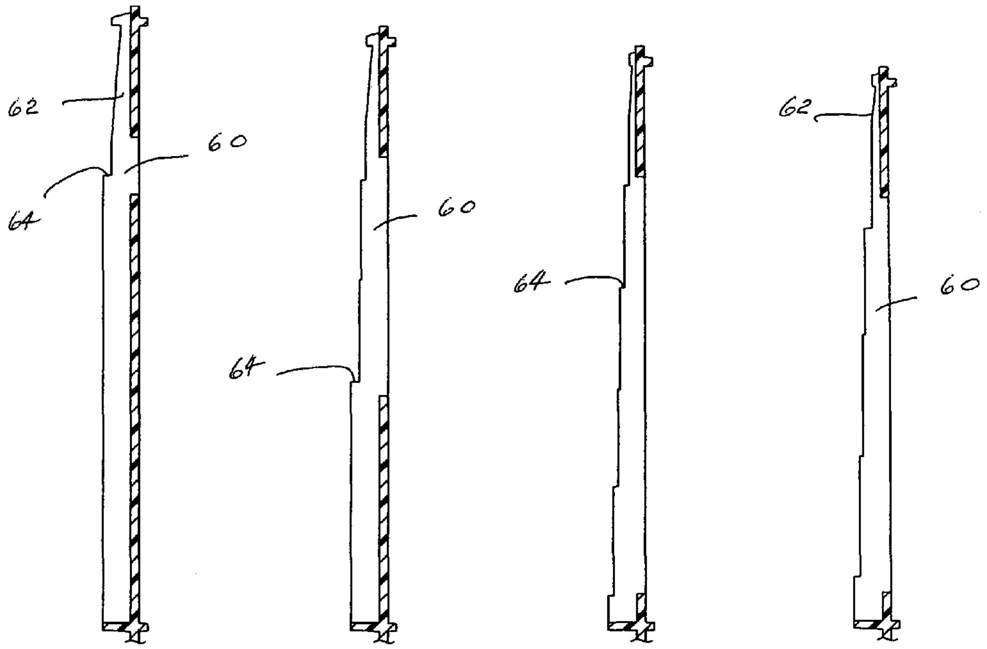
FIG. 8A is a sectional view along the line 8A-8A of FIG. 8.
FIG. 8B is a sectional view along the line 8B-8B of FIG. 8.
FIG. 8C is a cross-sectional view along the line 8C-8C of FIG. 8.
FIG. 8D is a cross-sectional view along the line 8D-8D of FIG. 8.
Figure 9:
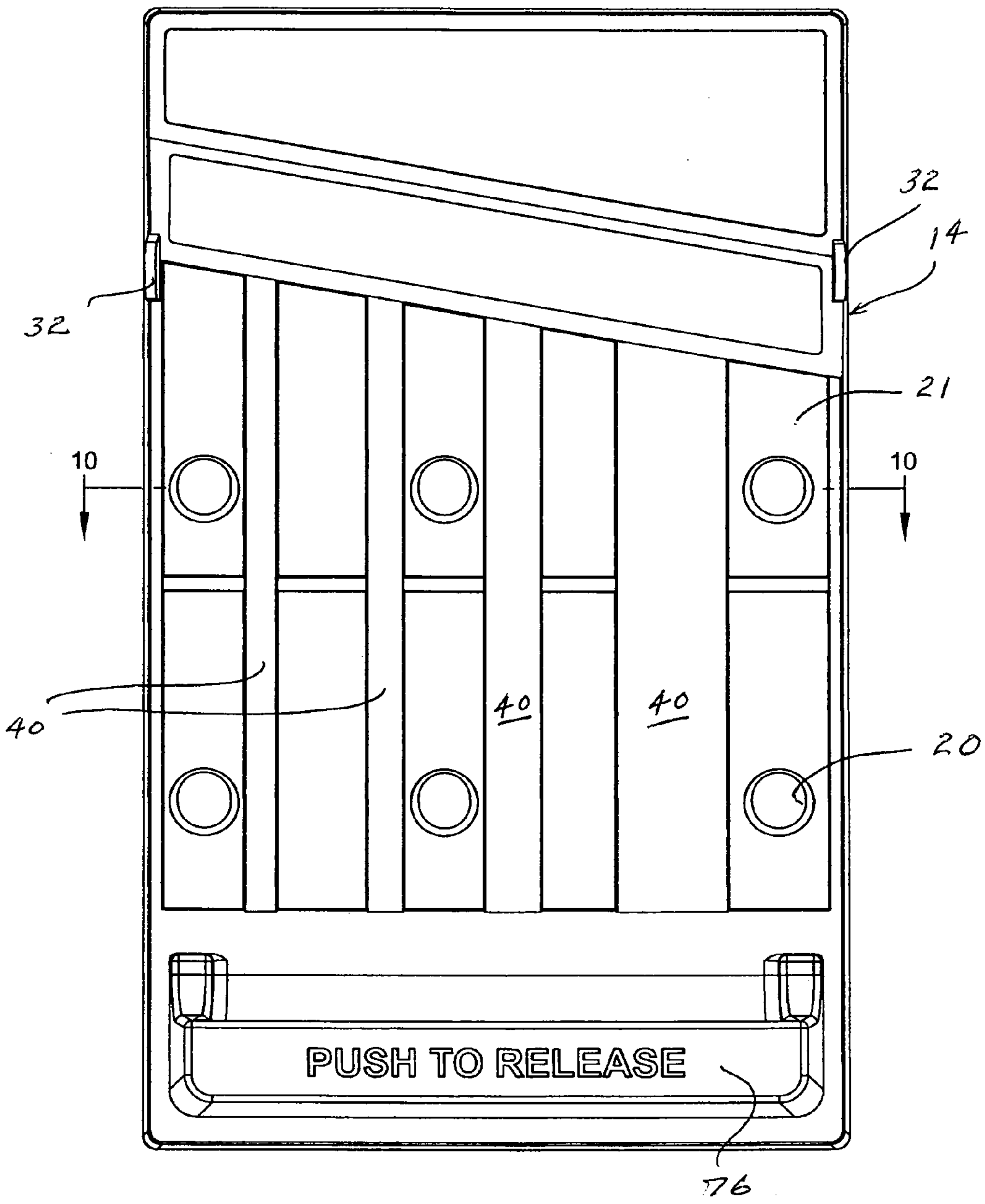
FIG. 9 is a front elevational view of the rear panel.
Figure 10:
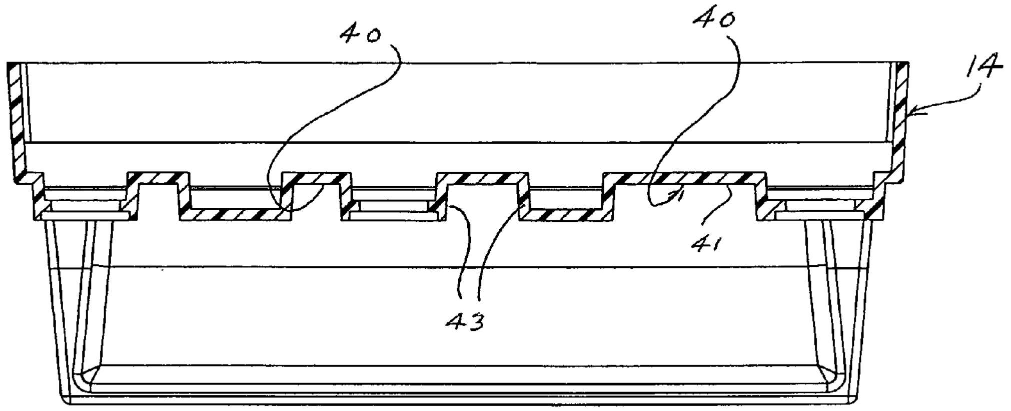
FIG. 10 is a cross-sectional view along the line 10-10 of FIG. 9.
Figure 11:
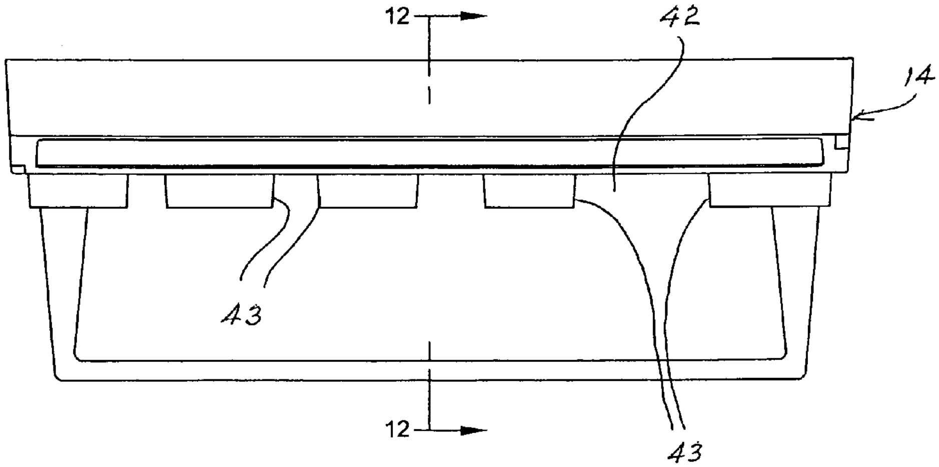
FIG. 11 is a top view of the rear panel shown in FIG. 9.
Figure 12:
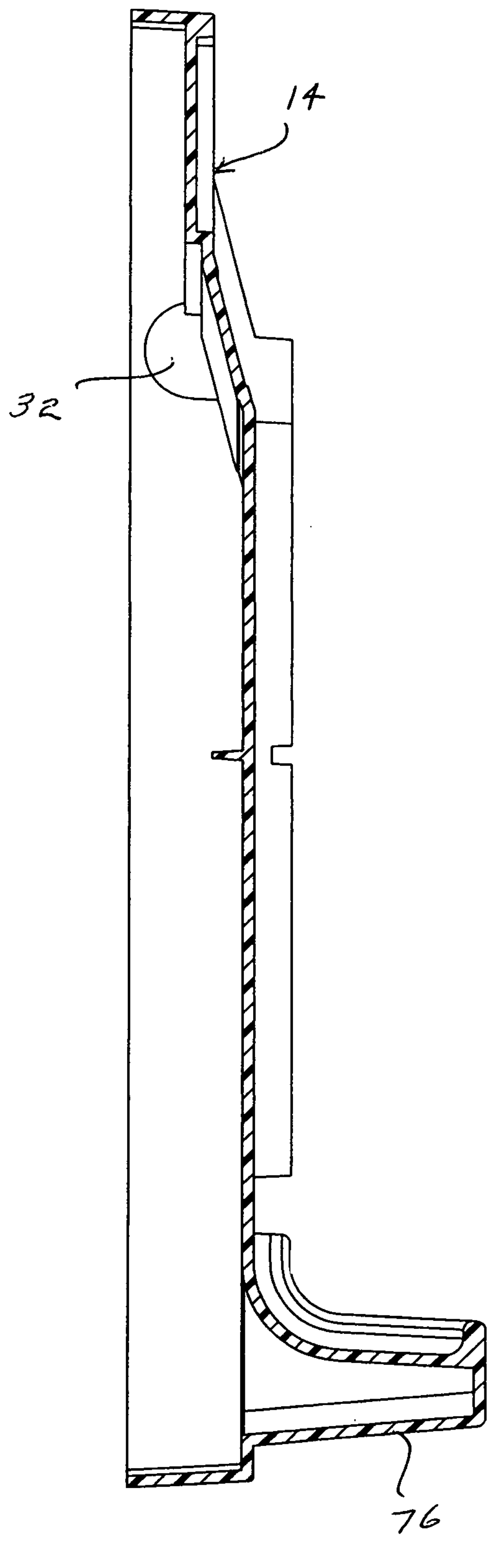
FIG. 12 is a cross-sectional view of the rear panel taken along the line 12-12 of FIG. 11.
Figure 13:
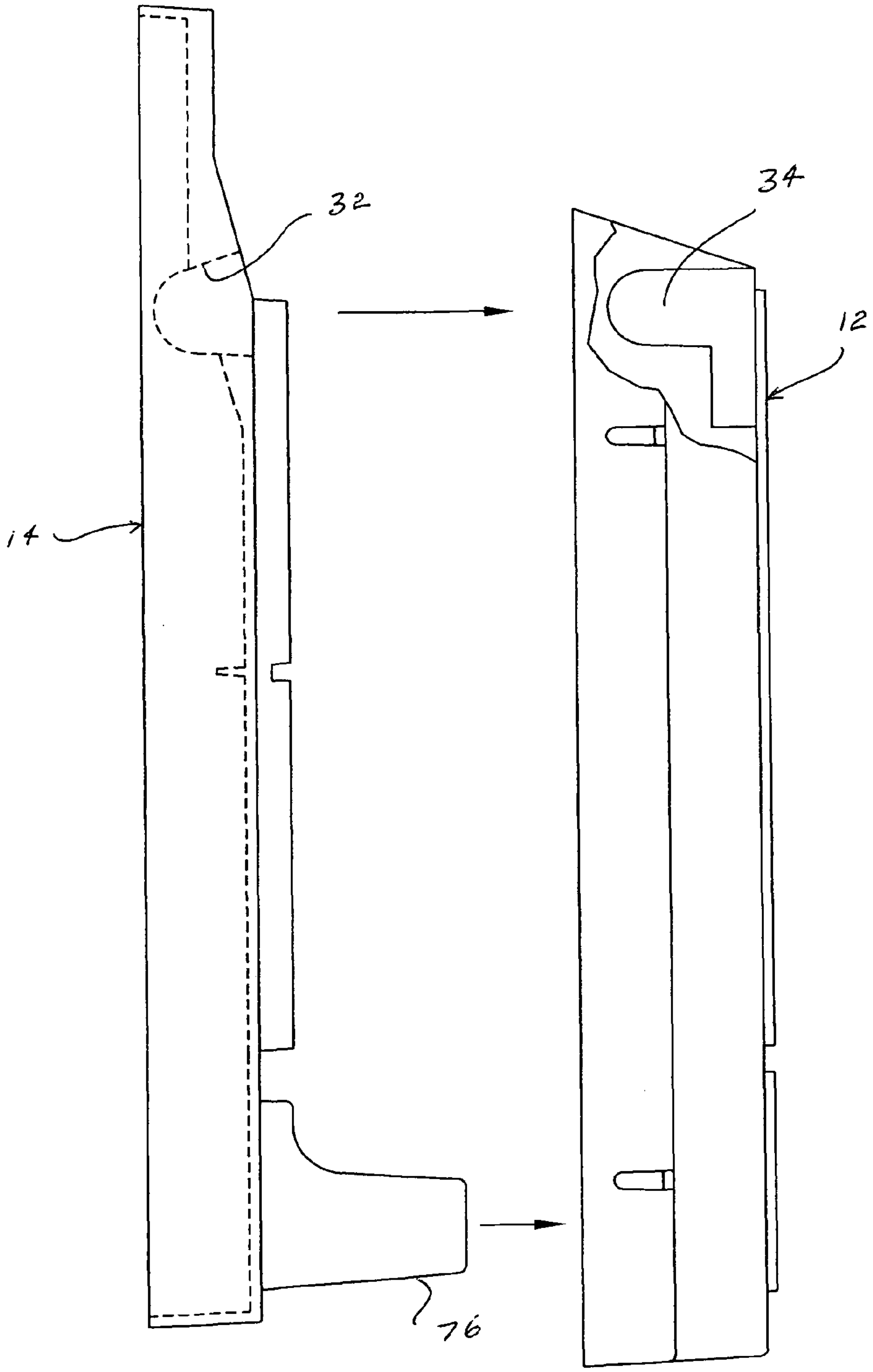
FIG. 13 is a side elevational view of the panels shown in FIG. 2 before being assembled in nested position with an upper portion of the front panel broken away.
Figure 14:
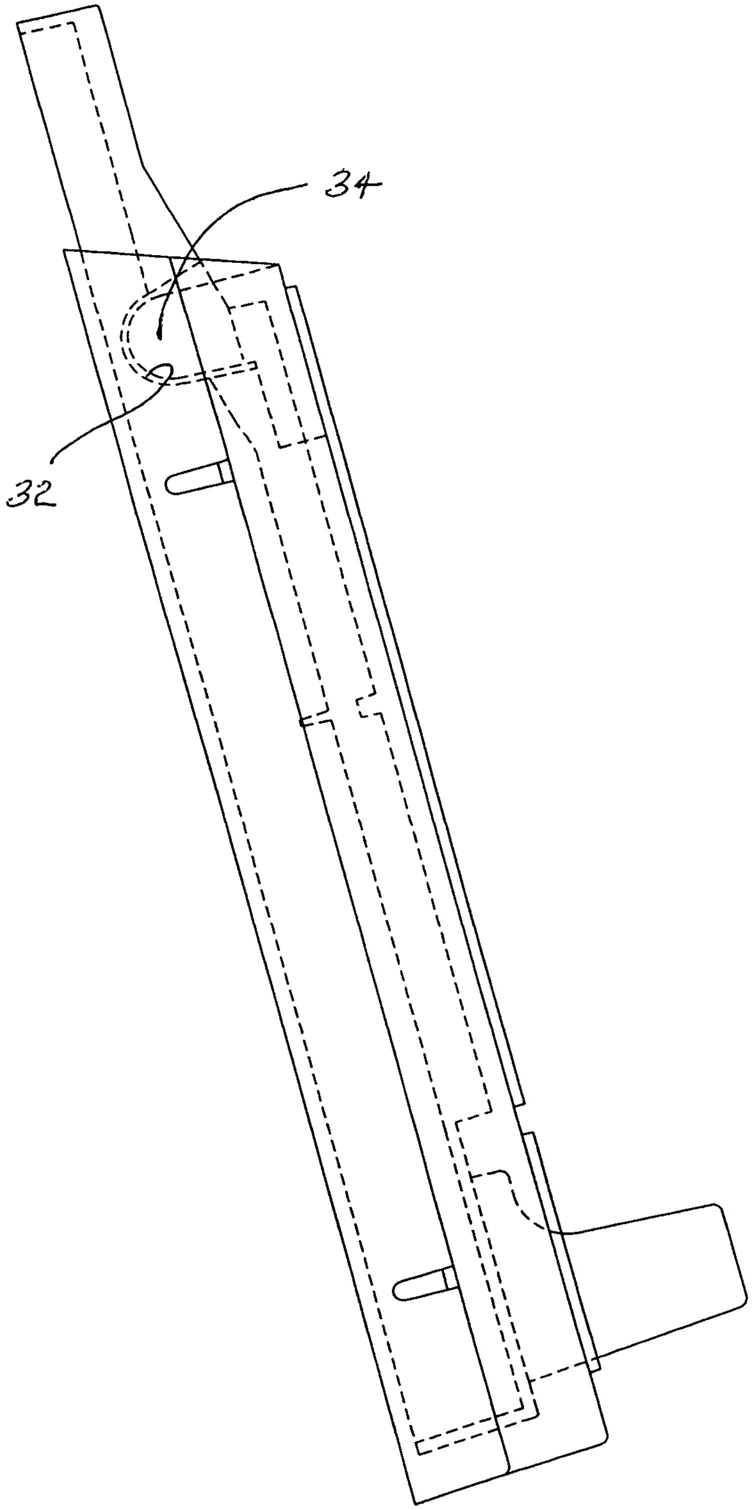
FIG. 14 is a side elevational view of the panels of FIG. 13.

As previously indicated, specialty batteries are constructed in standardized dimensions of diameter and thickness and thus can be identified as to type, model etc. by sorting via these two dimensions. The present invention provides a novel and practical device for accomplishing the accurate sorting of such batteries and, if desired, for other objects displaying such characteristics including but not limited to monetary coins, etc. The use of the device of the preset invention is primarily intended for a retail store setting as part of a display at which a consumer may purchase replacement batteries; and the device enables the consumer to easily identify the battery number and ultimately select the correct replacement battery.

Turning now to the drawings and particularly FIGS. 1-4, the device 10 includes a front panel 12 and a rear panel 14. The panels 12, 14 are assembled together and held in operational position by suitable spring means 15 comprising threaded posts 16, which rearwardly project from the rear wall 18 of the front panel 12. The threaded posts 16 project though aligned openings 20 formed in the front surface 21 of the rear panel 14. A coil spring 22, washer 24 and screw 26 engage the threaded posts 16 with one end of the coil spring 22 engaging the rear wall 18 of the front panel 12 and the other or opposite end of the spring 22 engaging the washer 24. The screw 26 is threaded into the threaded opening 17 of the posts 16; and thus by tightening or loosening the screws 26, the spring tension holding the panels 12 and 14 can be adjusted for a purpose which will hereinafter be further explained. The springs also act to reduce the tolerance variations present in the preferably injection molded ridges 60 which extend into the channels 40 which also will be apparent hereinafter.

The rear panel 14 includes sidewalls 30 on either side thereof which sidewalls 30 include a pair of rearwardly extending recesses 32 at the top thereof. These recesses 32 are in turn adapted to receive tabs 34 rearwardly extending from sidewalls 36 provided on either side of the front panel 12. The interaction of these tabs 34 and recesses 32 form a pivotal rest point interaction between the panels 12, 14 when nested together such that the lower portion of the rear panel 14 may pivotally move rearwardly with respect to the front panel 12 against the spring action of the spring means 15. Slits 36 provided in the sidewalls 35 of the front panel 12 enable screw or other fastening means (not shown) to connect the front panel 12 and thus the rear panel 14 by reason of the above-described connection to the front panel 12 to a support such as a display wall (not shown) or the like to position the device 10 in a rearward angle from the vertical or near vertical operational attitude.

The rear panel 14 includes a series of laterally spaced, vertically oriented open channels 40 extending into the front surface 21 thereof that terminate at their upper ends at an open slot 42. The channels 40 are of differing widths determined by the spacing of sidewalls 43 and dimensioned to equal or slightly exceed the diameter of a series of different diameter batteries starting with the channel 40 having the smallest lateral extent on the left of FIG. 2 and increasing to the right thereof. The top surface of the rear panel 14, in essence, forms a runway 44 for the batteries to be urged along from left to right that is interrupted by the open slots 42. In this way, a battery B placed onto the runway 44 on its edge and moving or rolling along the runway 44 will be free to fall or drop into the first open slot 42 which corresponds or slightly exceeds the battery's diameter. How many slots 42 and/or channels 40 provided in the device 10 depends upon the number of differently sized batteries that are to be accommodated or serviced by the device 10 of the present invention. Accordingly, the above-described runway 44 and variously sized diameter slots 42 comprise the battery diameter selection system 50 of the present device.

Once the battery falls or drops by gravity or is otherwise guided into the appropriately dimensioned open slot 42, such battery B is measured with respect to its diameter and guided to a temporary display position by a battery thickness selection system 52. This thickness selection system 52 is formed though the interaction of the open channels 40 and a series of vertically extending pairs of laterally-spaced ridges 60 which extend rearwardly from the rear surface 18 of the front panel 14 and nest into the channels 40 proximate the defining sidewalls 43 thereof. The ridges 60 each include a downwardly rearwardly extending tapered ramp 62 at the top end proximal the open slots 42 and then a series of abrupt inwardly extending ledges 64. The ramp 62 urges the battery B passing vertically into the slot 42 towards the base of the channel 40 after which the battery is free to pass beneath subsequent ledges 64 that define thickness from such ledge 64 to the base of the channel 40 that are greater than the thickness of the battery until the battery is stopped or halted by a ledge 64 that defines a thickness zone less than the battery thickness. The extent to which the ridges 60 and thus the ledges 64 extend into the channels 40 is maintained by contact of the rear surface 18 of the front panel 12 that lies between the pairs of ridges 60 with the front surface 21 of the rear panel 14 between the channels 40. In this way, an identifying selection of the battery thickness is achieved. The front panel 12 is also provided with vertically oriented openings 70 that correspond to and are generally similar in width to the channels 40 such that when the test battery becomes caught, trapped or otherwise stopped by the applicable identifying ledge 64, the user or consumer will be able to view the position of the battery through the appropriate opening 70. The model or battery numbers and/or other identifying indicia may be appropriately placed on the front surface 13 of the front panel 12 to aid in the selection and ultimate purchase of a replacement battery.

Figure 15:
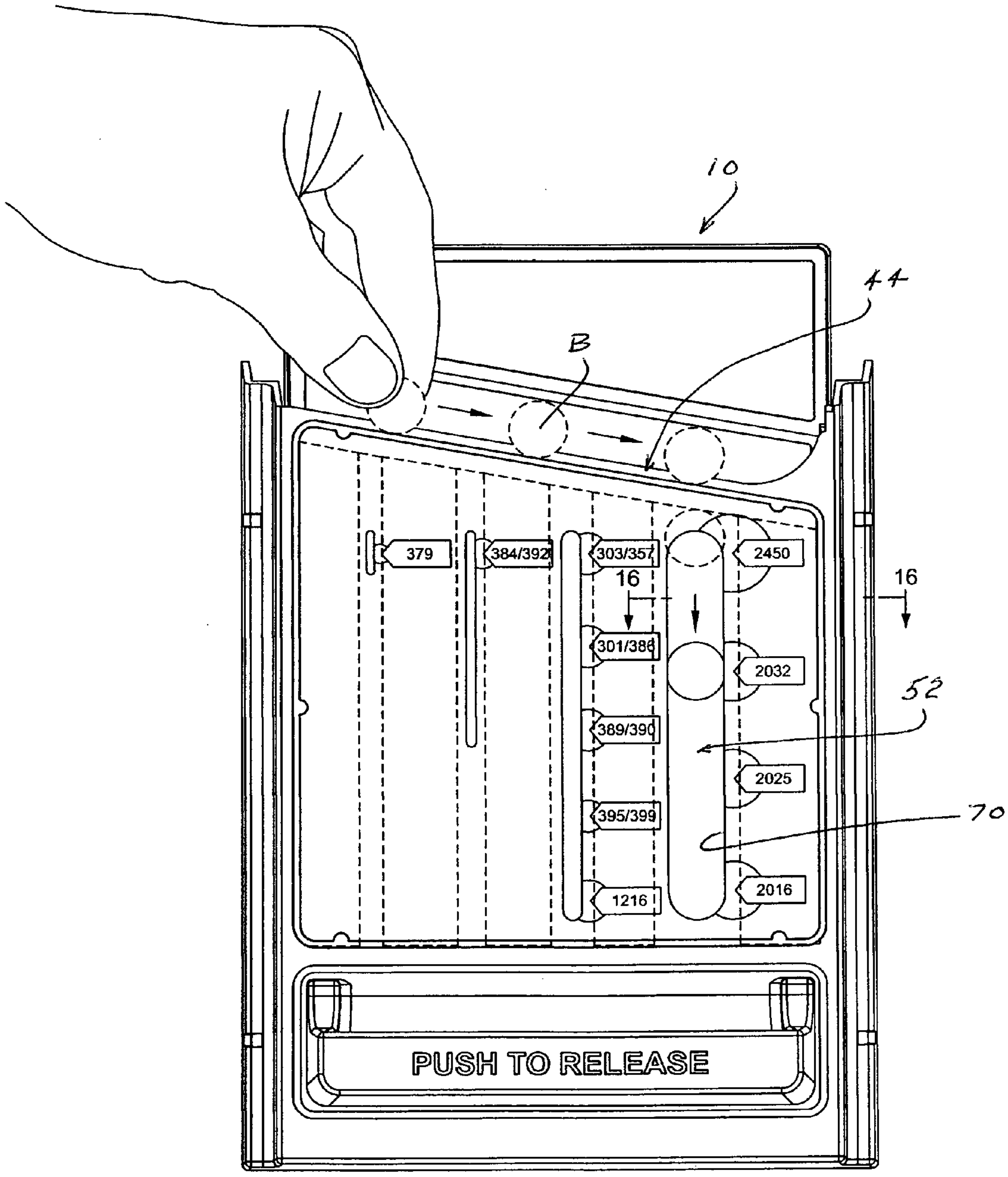
FIG. 15 is a front elevational view showing the device in stylized operation.
Figure 16:
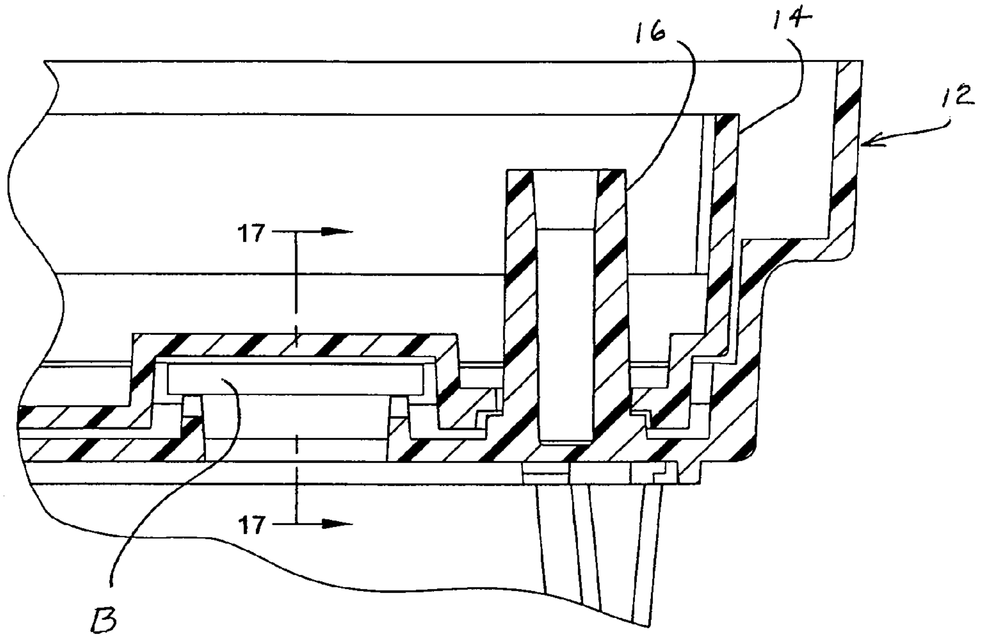
FIG. 16 is a cross-sectional view along the line 16-16 of FIG. 15.
Figure 17:
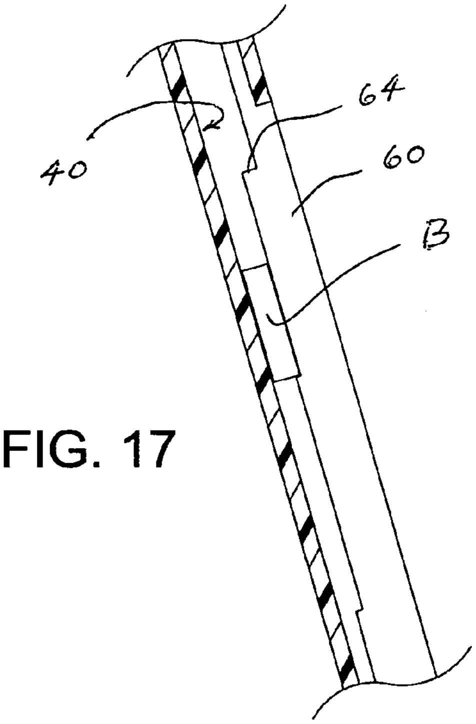
FIG. 17 is a cross-sectional view along the line 17-17 of FIG. 16.
Figure 18:
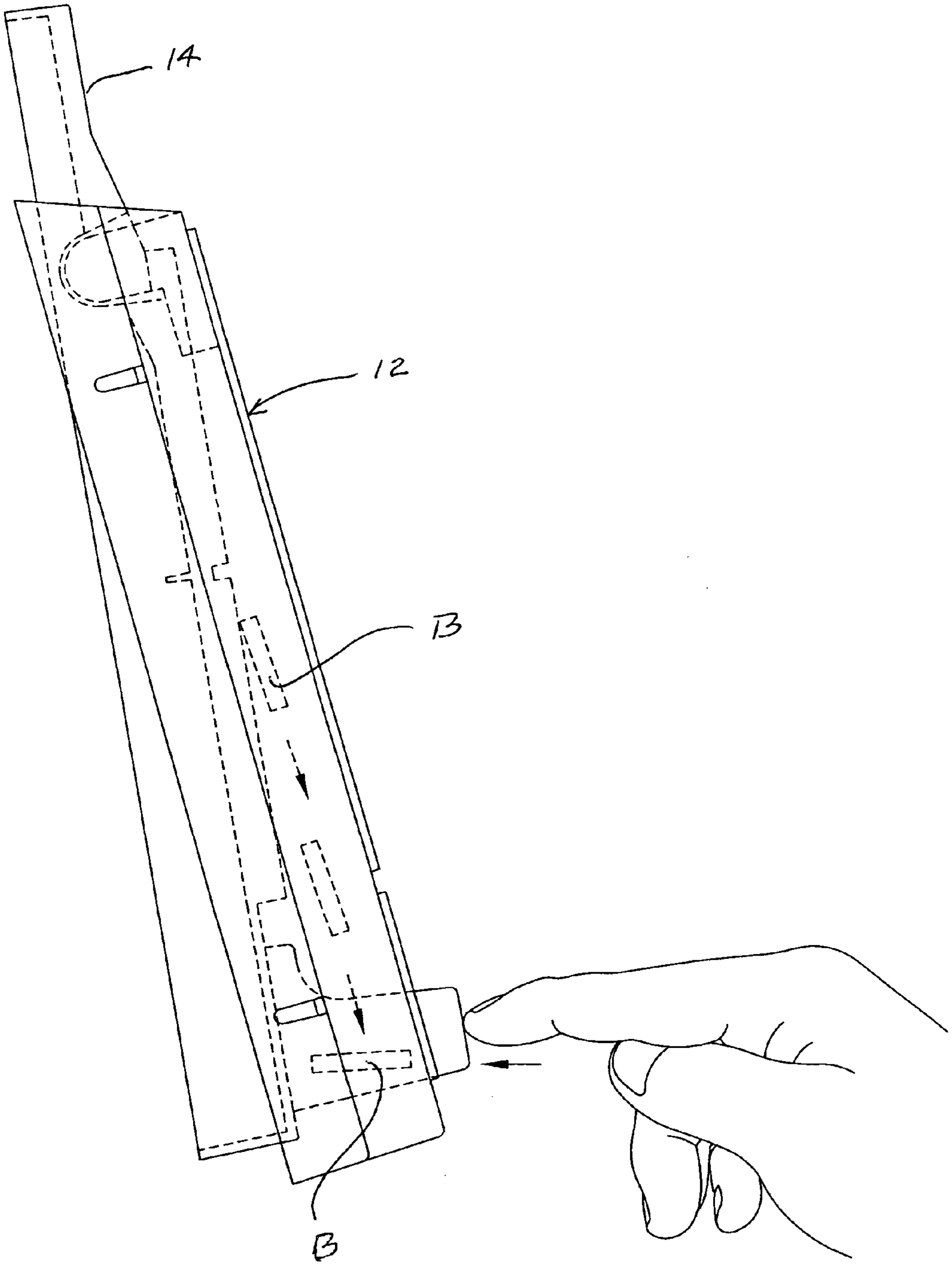
FIG. 18 is a side elevational view of the panels in nested operational position similar to FIG. 14 but with the lower portion of the rear is panel partially pivoted away from the front panel to release a battery held therein.
Figure 19:
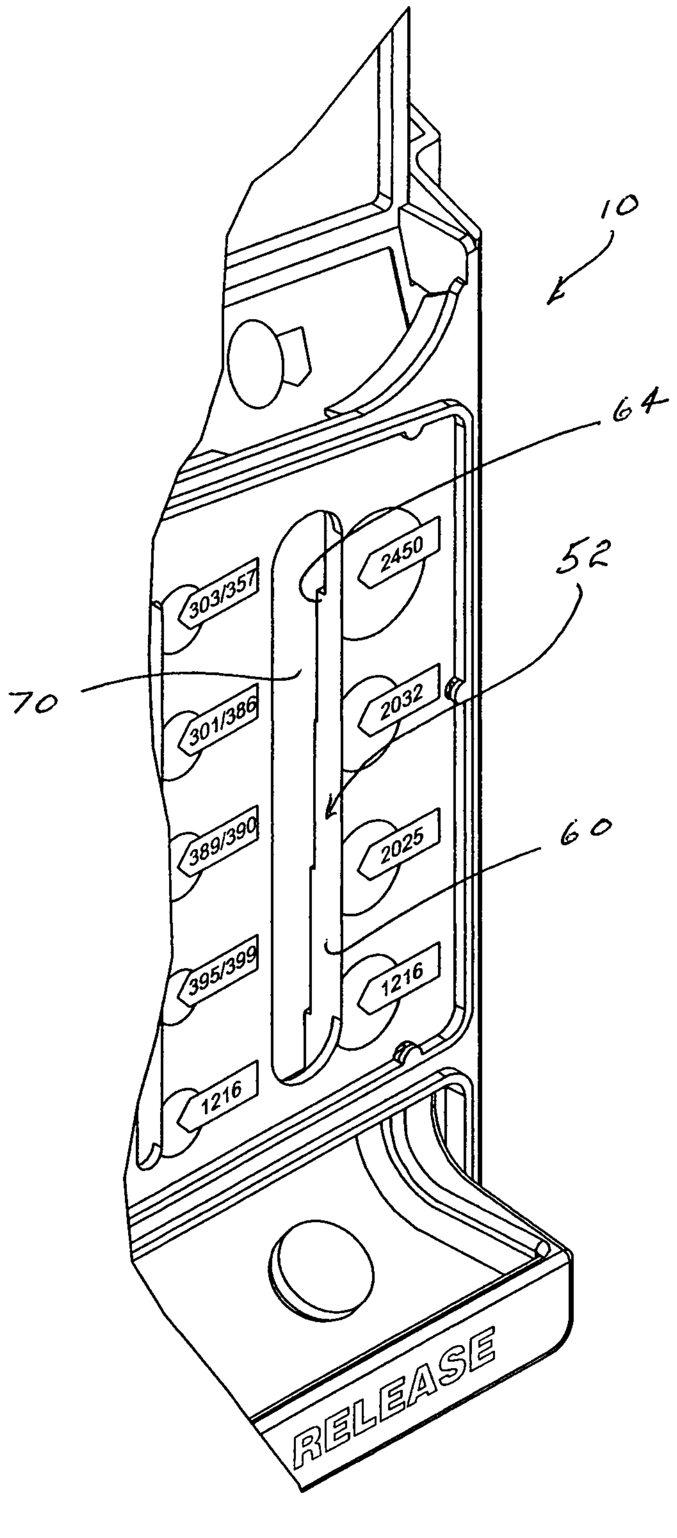
FIG. 19 is a partial perspective view of the device showing a battery held in a forwardly projecting tray.

Now turning to FIGS. 15-19 in particular, the manner in which the above battery selection and identifying procedure of the device 10 is best illustrated. In FIG. 15, the user or consumer pushes or otherwise guides the battery B on the battery's edge along the runway 44 until an adequately wide slot 42 allows the entrance of the battery B therein. Thereafter, the battery B falls by gravity due to the vertical upright positioning of the device down the channel 40 below the open slot 42 and is guided by the ramp 62 with a flat side of the battery against the floor 41 of the channel 40, thence past one of the ledges 64 as illustrated in FIG. 15 until the battery B is held by the next ledge 64 from continuing its downward path. The user can then retrieve the test battery B by simply temporarily separating the panels 12, 14 from each other. Such separation may be accomplished by pressing on the front wall 75 of a forwardly projecting tray 76 which projects from the rear panel 14 through an opening 78 formed in the base of the front panel 12. The pivotal mounting via the coaction of the tabs 34 and recesses 32 are such that the bottom of the rear panel 14 moves rearwardly away from the front panel 12 by overcoming the force of the spring means 15 so as to increase the spacing between the ridges 60 and the floor 41 of the channels 40 thus releasing the battery B so that the battery may fall downwardly between the panels 12, 14 and into a cup-like holding area 82 on the upper surface of the tray 76. Note and as best shown in FIG. 18, the positioning of the device at a slightly rearward angle assures that the upper portion of the battery B primarily rests against the floor of the channel 40 and as the rear panel 14 is pivoted away from the front panel, the battery B will fall away from the ledge 64 with which the lower battery portion is in contact and into the increased space between the panels 12, 14 and thence downwardly to the tray 76. This action and the rearward angular orientation of the device prevents the battery from perching on a ledge as the rear wall falls away. The spring means 15 disclosed provides for a wide range of adjustability of the force holding the panels 12, 14 in their operative position as well as for temporarily overcoming such force.

It should be pointed out that portions of the operational aspects of the device of the present invention may be practiced separately—for instance, batteries having the same diameter but of different thicknesses could be identified by the use of a single channel and ridge system of a width corresponding to the diameter (width) of such batteries.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for identifying a particular type of a coin-like object such as a specialty battery by progressively measuring first the diameter of said object and second the thickness of said object, said device comprising a frame in turn comprised of a front panel and a rear panel, said rear panel including a generally planar wall having a front surface in turn having upstanding transversely spaced vertically disposed sidewalls which define at least one generally vertically oriented channel having a front surface, an open slot at the top thereof and a closed bottom at varying vertical positions, said front panel including a generally planar wall having a front surface and a rear surface in turn provided with at least one pair of laterally spaced rearwardly extending vertically oriented ridges in turn adapted to extend into said rear panel channel when said panels are oriented in nested operational relationship with each other, said ridges including a plurality of vertically spaced ledges which extend into said channel to which the ridges are associated with and having a greater extent at the bottom of the channel than at the top thereof so as to create zones of progressively diminished thickness as said object travels down the channel from the top to the bottom thereof until said object is held from further travel by a channel bottom formed by the interaction between said channel front surface and the rear surface of said ridges associated with said channel.

2. The device of claim 1, including a plurality of vertically oriented channels, said vertically oriented channels being transversely spaced from each other and each of said channels of a differing width so as to accommodate said objects of varying diameter.

3. The device of claim 2, said rear panel including a top surface which in turn defines a runway interrupted by said vertically oriented channels so as to define a plurality of said open slots of increasingly larger lateral extent to accommodate said objects of varying diameter from small to large.

4. The device of claim 1, said thickness zones dimensioned to correspond to the different thicknesses of a variety of commonly used specialty batteries.

5. The device of claim 4, said front panel including indicia adjacent said zones of progressively diminished thickness to identify said object held in of one of said zones of progressively diminished thickness.

6. The device of claim 1, said front and rear panels operatively positioned together such that the rear panel may be temporarily moved rearwardly so as to materially increase the spacing between said panels so as to in turn allow said objects which have been processed to separate from said channel.

7. The device of claim 6, including spring means for operatively positioning the panels together, said front panel having a lower opening, said rear panel having forwardly projecting means which extends through said front panel lower opening such that pushing said forwardly projecting means rearwardly pivots the rear panel bottom away from the front panel.

8. The device of claim 7, said forwardly projecting means comprising a tray, said tray adapted to catch said object held in one of said zones of diminished thickness as said object falls upon the rearward pivoting of the rear panel.

9. The device of claim 1, said front panel further including at least one vertical opening adapted to overlie said at least one channel of said rear panel, the edges of said at least one opening defined by said rearwardly extending ridges of said front panel.

10. The device of claim 1, said front panel including a vertically oriented opening positioned over said at least one rear panel such that said object held in one of said zones of progressively diminished thickness is visible from said front wall.

11. A device for identifying a particular type of a coin-like object such as a specialty battery by progressively measuring first the diameter of said object and second the thickness of such object, said device comprising a frame in turn comprised of a front panel and a rear panel, said rear panel including a generally planar wall having a front surface in turn having upstanding transversely spaced vertically disposed sidewalls which define at least one generally vertically oriented channel having a front surface, an open slot at the top thereof and a closed bottom at varying vertical positions, said front panel including a generally planar wall having a front surface and a rear surface in turn provided with at least one pair of laterally spaced rearwardly extending vertically oriented ridges in turn adapted to extend into said rear panel channel when said panels are oriented in nested operational relationship with each other, said ridges including a plurality of vertically spaced ledges which extend into said channel to which the ridges are associated with and having a greater extent at the bottom of the channel than at the top thereof so as to create zones of progressively diminished thickness as said object travels down the channel from the top to the bottom thereof until said object is held from further travel by a channel bottom formed by the interaction between said channel front surface and the rear surface of said ridges associated with said channel, including a plurality of said vertically oriented channels transversely spaced from each other, each of said channels of a differing width so as to accommodate said objects of varying diameter, said rear panel including a top surface which in turn defines a runway interrupted by said vertically oriented channels so as to define a plurality of said open slots of increasingly larger lateral extent to accommodate said objects of varying diameter from small to large, said front and rear panels operatively positioned together such that the rear panel may be temporarily moved rearwardly so as to materially increase the spacing between said panels so as to in turn allow said objects which have been processed to separate from said channel, including spring means for operatively positioning the panels together, said front panel having a lower opening, said rear panel having forwardly projecting means which extends through said front panel lower opening such that pushing said forwardly projecting means rearwardly pivots the rear panel bottom away from the front panel.

12. The device of claim 11, said spring means comprising a plurality of spring means positioned at a plurality of laterally separated positions so as to apply an equal distribution of force across said panels so as to further urge said ridges into spaced relation to said channels.

13. The device of claim 11, said spring means comprising a plurality of threaded posts rearwardly extending from the rear wall of the front panel and projecting through aligned openings in the front surface of the rear panel, a coil spring positioned over each of said posts, said coil springs compressed by a washer and held by a screw engaged with each of said posts.

* * * * *